H. A. BROCKHAUS.
BUILDING MATERIAL.
APPLICATION FILED DEC. 15, 1919.

1,348,082. Patented July 27, 1920.

Witnesses
J. H. Crawford

Inventor
H. A. Brockhaus,
By Victor J. Evans
Attorney

UNITED STATES PATENT OFFICE.

HERMAN A. BROCKHAUS, OF WOODWARD, OKLAHOMA.

BUILDING MATERIAL.

1,348,082.

Specification of Letters Patent.   Patented July 27, 1920.

Application filed December 15, 1919. Serial No. 344,838.

*To all whom it may concern:*

Be it known that I, HERMAN A. BROCKHAUS, a citizen of the United States, residing at Woodward, in the county of Woodward and State of Oklahoma, have invented new and useful Improvements in Building Materials, of which the following is a specification.

This invention relates to building material and it consists in the novel features hereinafter described and claimed.

An object of the invention is to provide a material which may be economically and advantageously used for general building purposes and which will serve in a great measure as a substitute for lumber, is more durable, cheaper and produces a more comfortable building.

With this object in view the material includes sheet iron having one surface thereof exposed and to which paint may be applied in a usual manner to prevent rust or corrosion. A cementitious composition is applied to the opposite side of the sheet iron and the said composition includes fiber asbestos to render the same fire-proof. A sheet of fabric material is applied to the cement and the cement serves as a binder for retaining the fabric material in position upon the sheet iron.

In the accompanying drawing:—

Figure 1:
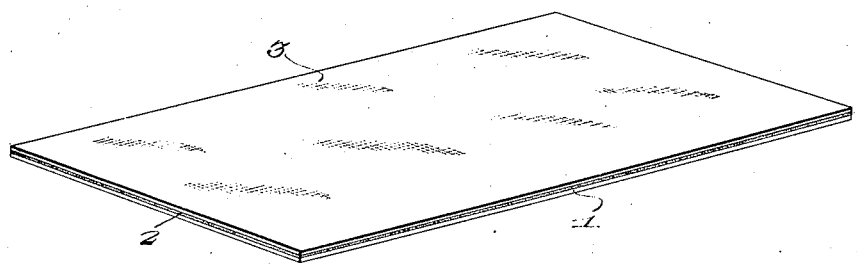
Figure 1 is a perspective view of a sheet of the building material.
Figure 2:
Fig. 2 is a transverse section through the sheet.

The building material includes a sheet of iron 1 having one surface thereof exposed and to which a coat of paint or other protecting material may be applied to prevent rust or corrosion. A coating 2 of cement is applied to the opposite side of the sheet 1 and the said coating may be a composition of ordinary commercial cement mixed with asbestor fiber. The fiber is added to the cement for the purpose of rendering the same fire-proof. A sheet of fabric 3 is applied to the cement and the cement serves as an adhesive for retaining the fabric 3 in position upon the sheet 1.

The material may be placed in a building or attached to the studding or joist thereof in the usual manner. The material when applied to its support will render the building warm in winter, cool in summer, and the sheet of fabric material 3 will serve as means for preventing heat from passing from the sheet of iron into the building inasmuch as the said fabric is a nonconductor of heat. The asbestos fiber embedded in the cement applied to one side of the sheet also assists in preventing the passage of heat through the sheet. The material will also deaden sound caused by rain falling on a roof or against the building. The material may also be used to advantage in localities where timber is scarce for building purposes. The cement applied to the sheet iron not only is an adhesive for retaining the fabric material in position upon the sheet iron but it serves the further function as means for closing the pores in the iron and consequently the iron will not become damp by reason of moisture passing through the pores thereof. In some instances heavy paper may be used in lieu of the fabric material to advantage.

Having described the invention what is claimed is:

As an article of manufacture, a wall board including a metallic sheet, a layer of cement applied to one side of the sheet, and having asbestos fiber embedded therein, and a sheet of fabric secured to the outer side of the layer of cement for securing the cement and the asbestos fiber embedded therein to the metallic sheet.

In testimony whereof I affix my signature.

HERMAN A. BROCKHAUS.